Patented Oct. 30, 1945

2,387,801

UNITED STATES PATENT OFFICE 2,387,801

PROCESSES FOR TREATING CELLULOSE MATTER AND RESULTING PRODUCT

Christopher Luckhaupt, Jamaica, N. Y., assignor to Luckite Processes, Inc., Delawanna, N. J., a corporation of New Jersey No Drawing. Application February 14, 1942, Serial No. 430,943

11 Claims. (Cl. 117—143)

This invention is directed to a process for treating cellulose and similar porous materials, and to the product resulting from such treatment.

An object of the invention is the provision of a process for treating cellulose and similar porous materials whereby the initial characteristics of the material such as hardness, tensile strength, compressional strength and flexural strength are much enhanced and whereby other properties, which will be brought out hereinafter, are imparted to the material being processed.

Another object of the invention is the provision of a process for the purpose above briefly outlined, in which inexpensive equipment may be employed in the practice of the invention, the necessity of vacuum or pressure tanks and the like, in the practice of my invention, being eliminated. The present invention may be practiced in open tanks, for instance, or the material being treated may be processed by spraying or by roller coating.

A still further object of my invention is the provision of a process wherein I employ a base material which has a high melting point. This is of material advantage where the product resulting from treatment by my process is to be subjected to high temperatures. Inasmuch as I desire under some conditions to employ other materials with the base material, these other materials being referred to hereinafter as "fortifiers" the high melting point base material is further advantageous in that the fortifiers are more easily combined.

Many other and further objects of the invention will appear from the following detailed description.

Generally speaking, my invention comprehends the treatment of cellulose and kindred materials with terpene hydrochloride $C_{10}H_{16}.HCl$. Terpene hydrochloride is a colorless crystalline mass resembling camphor, produced by the treatment of turpentine oil with HCl gas. It is insoluble in water and has a relatively high melting point, namely, 125° C. (257° F.). At melting temperature the viscosity of terpene hydrochloride is low, which is ideal for my purpose in that it enables me to obtain deep penetration of the cellulose or other material being processed in the minimum time. I find also that due to its high melting point there is no tendency of the terpene hydrochloride to crystallize out of the cellulose.

In practicing my invention in its simplest form, the cellulose or other material to be processed is simply immersed in the terpene hydrochloride with the latter above its melting temperature, say between 300° F. to 400° F.

The container for the terpene hydrochloride may be simply an open heated vat, inasmuch as I require no pressure or vacuum to effect the desired penetration of the material being processed.

I have found that the immersion time varies with the temperature of the treating material, the higher the temperature the lower the viscosity of the terpene hydrochloride and the more rapid its penetration. The porosity of the cellulose being treated is another factor which must be taken into consideration. The more porous the cellulose the shorter the immersion time necessary, and vice versa. However, in no case is the treatment period long. I have found that commercially an immersion period of twenty seconds is ample to obtain the penetration desired.

As above mentioned, I may treat by spraying instead of immersing. When spraying, the terpene hydrochloride temperature is raised to between 300° F. and 400° F. Improved results are obtained if the material being treated is heated slightly after spraying.

If desired the cellulose material may be coated on a suitable coating machine of the heated roller type. Here again the terpene hydrochloride is maintained at elevated temperature, between 300° F. and 400° F. preferably. I find penetration is increased if after treatment the material is run over heated rollers.

I have found that cellulose and allied porous materials treated as above described are very much enhanced in hardness, their tensile strength, flexural strength, compression strength, etc. being very materially increased.

While the terpene hydrochloride when used alone has the ability to enhance the hardness of the cellulose being processed and to impart water resistant and fire resistant characteristics to the cellulose, these characteristics may be enhanced and others added by employing, in conjunction with the terpene hydrochloride, materials hereinafter referred to as "fortifiers."

The fortifiers, when used, are added to the melted terpene hydrochloride. Inasmuch as the melting point of the base material is high, and inasmuch as it is of low viscosity at high temperatures, the fortifiers are readily incorporated. The amount of fortifier employed depends, of course, upon the results desired in the finished product. It may be stated as a general rule that the more of a given fortifier added the greater the effect.

I have discovered from hundreds of tests that the effective range of fortifiers extends over a range from 2% to 75% by weight of the terpene hydrochloride.

As already pointed out, cellulose and allied materials may be made water resistant by immersion in melted terpene hydrochloride, but this property or characteristic is very materially enhanced if fortifiers such as waxes and resins, natural and synthetic, be added to the melted terpene hydrochloride. Water resistance is increased too by the employment of stearates and terpene resin. The fortifiers specifically mentioned are merely illustrative and have not been specifically referred to by way of limitation.

If the flame-proof and fire-retarding characteristics of the finished product are to be further enhanced then I may add fortifiers such as ammonium phosphate, chlorinated waxes, cellulose acetate and tri-cresyl phosphate to the melted terpene hydrochloride.

Where it is necessary or desirable to prevent oxidation, impart flexibility and elasticity to the finished product, keep the finished product from drying out and becoming brittle, and generally to prolong the life of the finished product, then I may add fortifiers such as tricresyl phosphate, tri-phenyl-phosphate, cellulose acetate, dibutyl phthalate, or castor oil to the melted terpene hydrochloride.

Again fortifiers such as cellulose acetate, glyc-

The fortifiers, when used, are added to the the melted terpene hydrochloride to increase the resistance to oil of the finished product.

The terpene hydrochloride alone imparts hardness to the material being processed, but the material may be further hardened by the addition to the melted terpene hydrochloride of fortifiers such as indene resin, or cellulose acetate while the strength of the cellulose being processed is very materially enhanced by employing fortifiers such as ethyl cellulose, butyl cellulose, or cellulose acetate.

Adhesiveness is improved by employing fortifiers such as indene resin, linseed oil, rape seed oil, or polybutene.

I have already pointed out that terpene hydrochloride is of low viscosity at the higher temperatures; its viscosity is readily controlled by the addition of fortifiers such as vegetable oils and mineral oils. These same fortifiers, as well as polybutene and chlorinated rubber, may be employed to enhance the elasticity of the resulting products.

Rot-proofness can be imparted to the cellulose material being treated by adding sodium fluoride, creosote oil, dinitrophenol chromate, zinc chloride and the like to the melted terpene hydrochloride.

Materials high in dielectric strength and insulating value may be produced from cellulose by the addition to the melted terpene hydrochloride of fortifiers such as chlorinated waxes, latex, cellulose acetate, or ethyl cellulose. The resulting product is highly insulating and acceptable under the fire underwriters' requirements as commercial electrical insulation.

It is to be understood that the various groups of fortifiers above referred to may be used alone or along with the fortifiers of any of the other groups.

When desired, instead of processing preformed articles or objects, I may employ my process in the production of moulding powders. The cellulose may be ground or otherwise finely divided and then by adding terpene hydrochloride along with fortifiers such as cellulose acetate and triphenyl phosphate I have a thermoplastic material. If the material is to be thermo-setting then fortifiers such as latex and sulphur should be substituted.

A vast variety of products may be produced by the practice of my invention. I have found, for instance, that I am able readily to produce a product possessing the strength of natural wood from plywoods and like laminated materials, my product being highly resistant to or proof against moisture, water, fire, vermin, etc.

I am also able to process textiles of rayon or other synthetic cellulose matter, making these textiles highly resistant to water absorption and combustion without detrimentally affecting the pliability of the textile, this property or characteristic being readily controlled by plasticizers, such as those above referred to, for example.

I have found that existing commercial products such as cellulose sheets, corrugated board, bags, cups and a vast variety of other products are transformed into strong rigid objects possessing any of the stated additional characteristics above referred to and to any degree desired at the option of the processor.

I have found, furthermore, by extensive tests, that tubes and rods and like articles made of paper or wood pulp when treated by my process are comparable in strength, weight, supporting qualities, resistance against crushing, etc. to natural wood, metal and the like, depending upon the fortifier added. It is to be understood also that such objects or materials may optionally be made moisture-proof, fireproof, oil repellent, etc.

I have found that cellulose material treated in accordance with my invention is converted into a material in which the normal interstices of the surfaces of the original material and the inner voids of the material are completely closed by the terpene hydrochloride or by the terpene hydrochloride with the addition of the various fortifiers above referred to, and the surface of the treated material is smooth. A surface coating of the treating material is desirable in some instances. This may be brought about readily by first immersing, as above described, and then before removal lowering the temperature of the bath.

I find that when processing pre-shaped objects there is no tendency for the same to shrink or warp.

It might be well to mention also that cellulose materials processed in accordance with my invention are almost completely devoid of any tendency to split when being worked and may be readily bored, readily sawed, cut or otherwise severed, readily planed, readily pierced by nails or screws and readily shaped by ordinary shaping tools, all without splitting and without surface checking. I find, furthermore, that in so far as operations involving sawing, cutting or otherwise severing the material are concerned, that the severed edges are smooth and free from irregular or jagged parts and entirely free from loose fibers or fragments of the severed material.

While I have described my invention with reference to certain specific fortifiers, etc., it is to be understood that changes and modifications may be made within the purview of my invention.

What I claim is:

1. The method of treating cellulose material, which method comprises impregnating the cellulose material with terpene hydrochloride while the hydrochloride is at a temperature at or above its melting point.

2. The method of treating cellulose material, which method comprises impregnating the material to be treated with terpene hydrochloride by immersion of the material in the terpene hydrochloride while the latter is at a temperature at or above its melting point.

3. The method of treating cellulose material, which method comprises impregnating the material by subjecting the same to the action of a spray of the terpene hydrochloride at a temperature at or above the melting point of the hydrochloride.

4. An object made from cellulosic material and having its normal interstices impregnated with a material comprising solid terpene hydrochloride.

5. The method of treating cellulose material, which method comprises impregnating the material to be treated by immersion of the material in an open bath of terpene hydrochloride while the latter is at a temperature at or above its melting point.

6. The method of treating cellulose material to render the same highly flame-resistant, which method comprises impregnating the cellulose material with an admixture of terpene hydrochloride and a flame-proofing material, with the admixture at a temperature not less than the melting temperature of the terpene hydrochloride.

7. The method of oil-proofing cellulose material, which method comprises impregnating the cellulose material with an admixture of terpene hydrochloride and an oil-proofing agent heated to above the melting temperature of the terpene hydrochloride.

8. The method of rot-proofing cellulose material, which method comprises impregnating the material with an admixture of terpene hydrochloride and a rot-proofing agent heated to above the melting temperature of the terpene hydrochloride.

9. The method of oilproofing cellulose material, which method comprises impregnating the material to be treated by immersion in an admixture of terpene hydrochloride and cellulose acetate with the admixture at a temperature at or above the melting point of the terpene hydrochloride.

10. The method of oilproofing cellulose material, which method comprises impregnating the material to be treated by immersion in an admixture of terpene hydrochloride and glycerophosphate with the mixture at a temperature at or above the melting point of the terpene hydrochloride.

11. The method of oilproofing cellulose material, which method comprises impregnating the material to be treated by immersion in an admixture of terpene hydrochloride and terpene resin with the admixture at a temperature at or above the melting point of the terpene hydrochloride.

CHRISTOPHER LUCKHAUPT.